(No Model.)
J. S. ROWELL.
SPRING CULTIVATOR TOOTH.
No. 410,769. Patented Sept. 10, 1889.
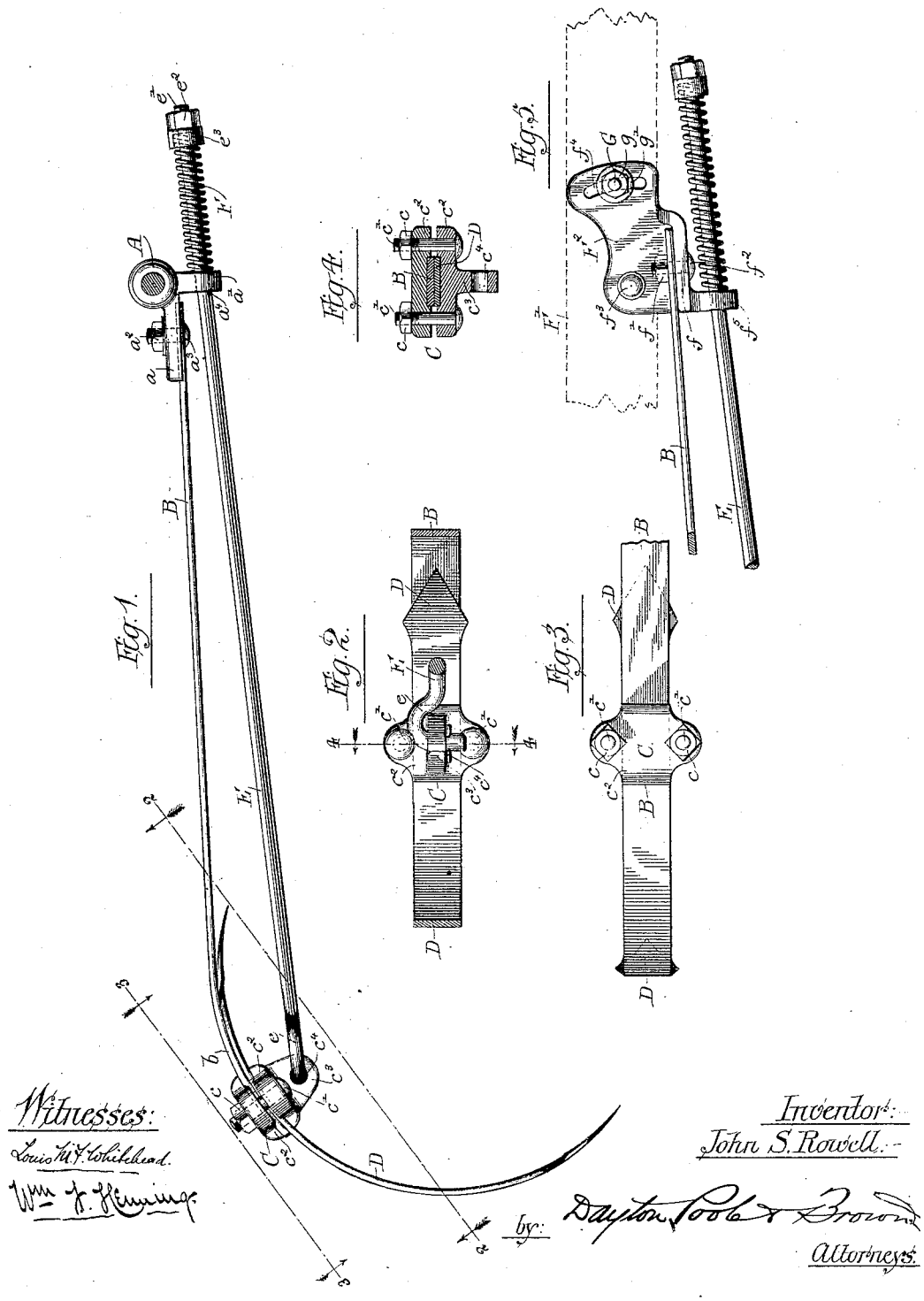
Witnesses:
Louis M. F. Whitehead.
Wm. F. Fleming.
Inventor:
John S. Rowell.
by Dayton, Poole & Brown
Attorneys.

UNITED STATES PATENT OFFICE.

JOHN S. ROWELL, OF BEAVER DAM, WISCONSIN.

SPRING CULTIVATOR-TOOTH.

SPECIFICATION forming part of Letters Patent No. 410,769, dated September 10, 1889.

Application filed May 27, 1889. Serial No. 312,231. (No model.)

*To all whom it may concern:*

Be it known that I, JOHN S. ROWELL, of Beaver Dam, in the county of Dodge and State of Wisconsin, have invented certain new and useful Improvements in Attachments for Spring Cultivator-Teeth; and I do hereby declare that the following is a full, clear, and exact description thereof, reference being had to the accompanying drawings, and to the letters of reference marked thereon, which form a part of this specification.

This invention relates to an improvement in devices for the attachment of spring-teeth to cultivator-beams; and the same consists in the novel devices and combination of devices herein shown, described, and more particularly set forth in the appended claims.

In the drawings, Figure 1 is a view in side elevation of a spring-tooth and devices embodying my invention for connecting the same to a cultivator-beam. Fig. 2 is a transverse sectional view taken upon the line 2 2 of Fig. 1, looking in the direction indicated by the arrows. Fig. 3 is a plan view of the spring-tooth clamp, looking from the position indicated in line 3 3 of Fig. 1. Fig. 4 is a transverse vertical sectional view of the clamp, taken upon line 4 4 of Fig. 2. Fig. 5 is a detail view showing another form of securing the spring-tooth connections to the cultivator.

In said figures, A is a spool or sleeve upon the transverse rod or beam of the cultivator, and is provided with two flanges or lugs $a$ $a'$. To the lug $a$ is secured by a nut $a^2$ and bolt $a^3$ the flat spring-bar B, which extends to the rear, and is curved at its other end, as shown clearly at $b$. The rear and curved end of the bar B is secured between the two parts of the clamp C.

D is the curved reversible spring cultivator-tooth, also secured between the two parts of the clamp C. The tooth D is placed in the clamp C beneath the curved end of the spring-bar B. The two parts of the clamp C are secured together by means of the nut $c$ on the bolts $c'$, which pass through holes in the two flanges $c^2$. The relative position of the spring-tooth D with reference to the spring-bar B may be altered at will after first loosening the nuts $c$ on the bolts $c'$. A lug $c^3$ is provided to the lower side of one of the parts of the clamp C, through which lug is a suitable hole or opening $c^4$.

E is a rod or bar provided at one end with a hook $e$, adapted to engage in the hole or opening $c^4$ of the lug $c^3$. This bar is passed through a hole or opening $a^4$ in the lug $a'$, and is extended to the front a short distance. Upon this extended end of this bar E are screw-threads $e'$ to engage the threads of the nut $e^2$.

Surrounding the forward end of the bar E and positioned between the lug $a'$ and the nut $e^2$ is the spiral spring F, one end of which bears against the lug $a'$ and the other end of which bears against the cap or washer $e^3$, interposed between said spring and the nut $e^2$.

It will be noticed that by this construction not only is the tooth D the spring or yielding tooth, but its supporting-bar B is yielding; also, that the adjacent bar E is spring-actuated by means of the spring F. In other words, when the tooth D strikes an obstruction there are three yielding parts—to wit, the said tooth D itself, the thin spring-bar B, and the longitudinally-movable bar E. It will also be noticed that the clamp C affords an easy and convenient means of adjusting the tooth D with reference to the bar B, whereby the tooth may be set at different angles for deep or shallow cultivating.

In Fig. 5 I have illustrated a modified form of attachment of the spring-bar B to the longitudinal movable bar E, which will be necessary in a corn-cultivator having a wooden cross-bar or beam F'. In this form the bar B is secured to a flange or shoulder $f$ of a metal plate $F^2$ by means of a nut $f'$ and bolt $f^2$. The plate $F^2$ is movably secured to the wooden beam by a pivotal connection $f^3$, and is adjustable on said beam F' by means of the stud G, secured to said beam and projecting through a suitable slot $f^4$ in said plate $F^2$. The plate $F^2$ is fastened in any given position by means of a nut $g$ and a washer $g'$ on the stud G. The plate $F^2$ is also provided with a lug $f^5$, similar to the lug $a'$ of the sleeve A.

The tooth D is adjusted for deep or shallow cultivating by the spring adjusting device on the end of the rod E, and may be still further adjusted by the employment of the adjustable plate, as shown in Fig. 5.

The employment of the double yielding connection B and E of the spring-tooth makes the latter very much stronger and more reliable when in operation.

What I claim is—

1. In a cultivator, a spring-tooth connected to the cultivator-beam by a flat spring-bar, one end of which bar is rigidly secured to a plate on the said beam, and a longitudinally-movable rod connected to said tooth and said plate, substantially as specified.

2. The combination, with a plate adjustably secured to the beam of a cultivator and a spring-tooth, of a flat spring-bar connecting said tooth with said plate, and a rod connected at one end to the tooth and provided on its other end with an adjustable connection with said plate, whereby a double adjustment of the cultivator-tooth with reference to the beam is possible, substantially as described.

In testimony that I claim the foregoing as my invention I affix my signature in presence of two witnesses.

JOHN S. ROWELL.

Witnesses:
 H. W. KEYES,
 A. M. GREENE.